United States Patent [19]
Loistl et al.

[11] Patent Number: 5,414,304
[45] Date of Patent: May 9, 1995

[54] DEVICE FOR SUPPRESSING VOLTAGE DROPS

[75] Inventors: Hans Loistl, Schwieberdingen; Jochen Bach, Dusslingen, both of Germany

[73] Assignee: Robert Bosch GmbH, Stuttgart, Germany

[21] Appl. No.: 952,837

[22] PCT Filed: Feb. 21, 1992

[86] PCT No.: PCT/DE92/00126

§ 371 Date: Nov. 23, 1992

§ 102(e) Date: Nov. 23, 1992

[87] PCT Pub. No.: WO92/16992

PCT Pub. Date: Oct. 1, 1992

[30] Foreign Application Priority Data

Mar. 23, 1991 [DE] Germany .................. 41 09 645.2

[51] Int. Cl.$^6$ ............................................. H02J 1/00
[52] U.S. Cl. ........................... 307/10.1; 307/103; 307/130
[58] Field of Search ............ 307/9.1, 10.1, 10.6, 307/10.7, 10.8, 64, 66, 87, 23, 125, 130, 103

[56] References Cited

U.S. PATENT DOCUMENTS

| 4,305,004 | 12/1981 | Tanaka et al. | 307/10.6 |
| 4,342,922 | 8/1982 | DiMassimo et al. | 307/66 |
| 4,698,578 | 10/1987 | Mullersman et al. | 307/66 X |
| 5,118,962 | 6/1992 | Ishii et al. | 307/64 |

FOREIGN PATENT DOCUMENTS 4041620 12/1990 Germany .
91/00636 1/1991 WIPO .
91/00637 1/1991 WIPO .

Primary Examiner—A. D. Pellinen
Assistant Examiner—Fritz M. Fleming
Attorney, Agent, or Firm—Michael J. Striker

[57] ABSTRACT

In a device for suppressing voltage drops in apparatuses which can be connected with a battery via at least two lines, one line serves to supply voltage permanently and the other line can be switched on or off via a switch. To prevent voltage drops which can occur on the permanent voltage supply side from negatively affecting the voltage supply to the apparatus, the permanent voltage supply is taken over by the other connected line via a circuit arrangement situated between the two lines when voltage drops occur while the switch is closed.

6 Claims, 1 Drawing Sheet

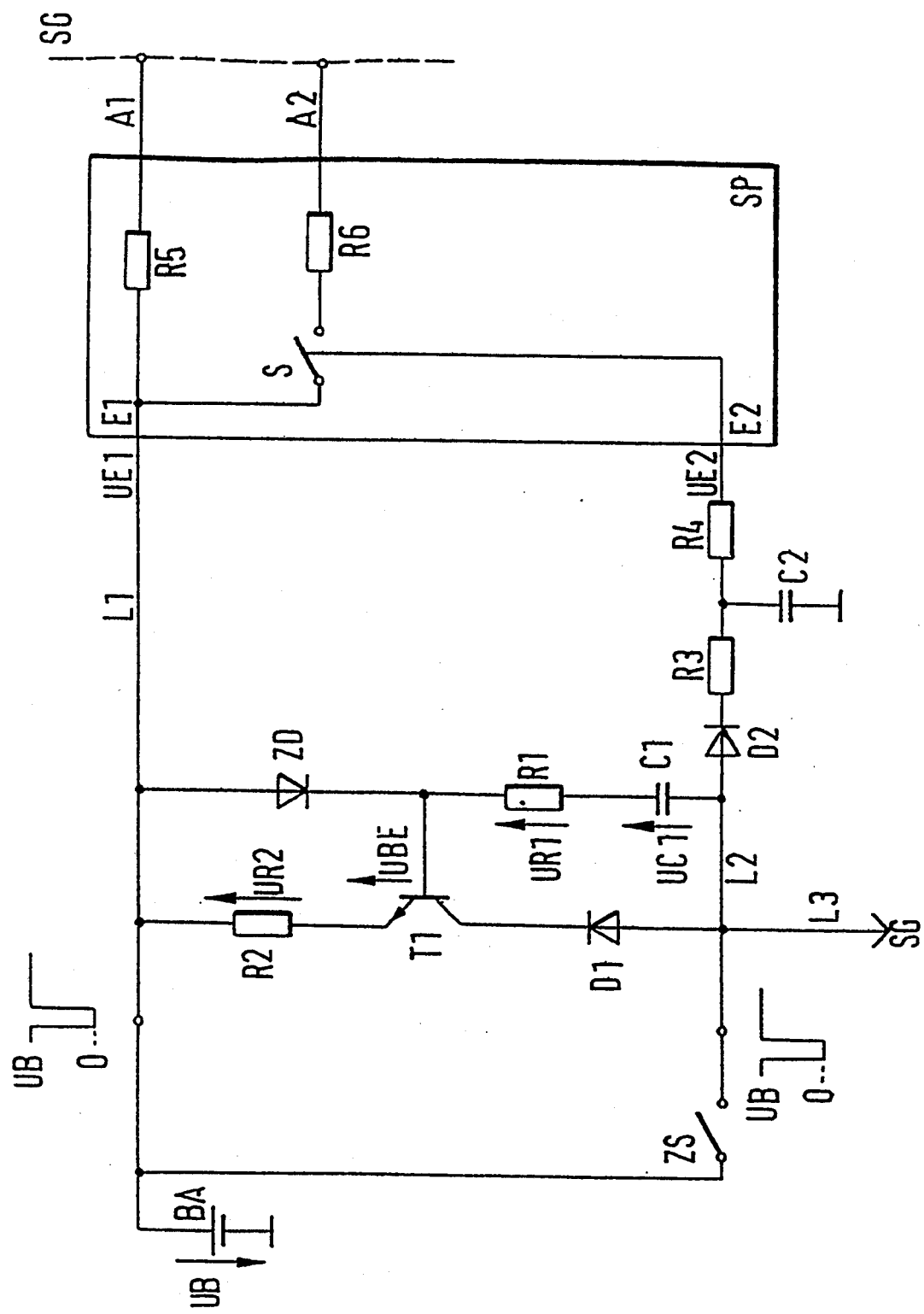

DEVICE FOR SUPPRESSING VOLTAGE DROPS

BACKGROUND OF THE INVENTION

The present invention relates to a device for suppressing voltage drops.

More particularly it relates to a device for suppressing voltage drops in apparatuses which can be connected with a battery via at least two lines for their voltage supply.

The control or regulating of the engine of a motor vehicle and also the control of anti-lock systems (ABS) or drive slip regulators (ASR) is conventionally effected at present by means of a control apparatus. The control apparatus is supplied with voltage by the battery of the motor vehicle. Since special demands are made on the regularity of this voltage a separate voltage regulator is usually associated with the control apparatus.

In a control apparatus voltage supply described in DE-P 40 41 620, which does not have a prior publication date, a first input of the control apparatus is permanently supplied with voltage via a first line. There is no provision for interrupting the voltage supply when the engine is switched off.

A second input of the control apparatus is supplied by connected battery voltage via a second line. The ignition switch is connected between the battery and the control apparatus input. When the engine is switched off, the ignition switch is opened and voltage is no longer applied to the corresponding control apparatus input.

Such a voltage supply has proven advantageous because a motor vehicle has different consumers, some of which must be supplied with voltage constantly even when the engine is switched off, while others must be supplied with voltage only during operation.

However, the arrangement described in DE-P 40 41 620 has the disadvantage that the permanent voltage supply or connected battery voltage is temporarily interrupted in an impermissible manner during disturbances, e.g. temporary voltage drops which can occur during rough operation of a motor vehicle, and this interruption then leads to a resetting of the control apparatus. Since a reinitializing of the microcomputer system of the control system is required after such a resetting, no controlling of the fuel injection or ignition, for example, can be effected by the control apparatus during this initializing period.

SUMMARY OF THE INVENTION

Accordingly, it is an object of the present invention to provide a device for suppressing voltage drops, which avoids the disadvantages of the prior art.

In keeping with these objects and with others which will become apparent hereinafter, one feature of the present invention resides, briefly stated, in a device for suppressing voltage drops in apparatuses which can be connected with a battery via at least two lines for their voltage supply, wherein in accordance with the present invention a circuit arrangement is provided between the two lines, and a connection to the second line is produced when the voltage drop occurs on the first line.

When the device for suppressing voltage drops is designed in accordance with the present invention, it has the advantage over the prior art that the control apparatus continues to be permanently supplied with voltage when a voltage drop occurs because the voltage is supplied in this case via the second line carrying the connected battery voltage as well as via the circuit arrangement arranged between these two lines.

It is particularly advantageous that the circuit arrangement located between the two lines can conduct high current and causes no considerable voltage drop.

Under normal circumstances, i.e. in the absence of voltage drops, the circuit arrangement arranged between the two lines does not influence the voltage supply. This is an additional advantage of the device according to the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view schematically showing a device for suppressing voltage drops in accordance with the present invention.

DESCRIPTION OF THE PREFERRED EMBODIMENTS

The positive terminal of a battery BA, whose negative terminal is grounded, is connected via a first line L1 with a first input E1 of a voltage regulator SP which is a component part of a control apparatus SG. Further, the positive terminal of the battery BA is connected with a second input E2 of the voltage regulator SP via a second line L2 and a series connection of a diode D2, a resistor R3 and a resistor R4. The ignition switch ZS is situated between the battery BA and the diode D2.

The connection point between the resistors R3 and R4 is connected to ground via a capacitor C2. An additional line L3 leads from the connection point between the ignition switch ZS and the anode of the diode D2 at a side of the ingition switch ZS which is opposite to the battery BA to the control apparatus SG.

The circuit arrangement according to the invention is located between the lines L1 and L2. The anode of a Zener diode ZD is connected to the line L1. Its cathode is connected with one side of a resistor R1 whose other side is connected with a capacitor C1 which is connected in turn to the line L2, the connection point being located between the ignition switch ZS and the anode of the diode D2.

A series connection of a resistor R2, the emitter-collector junction of a transistor T1 and a diode D1 is connected parallel to the series connection of the Zener diode ZD, the resistor R1 and the capacitor C1 between lines L1 and L2. The anode of the diode D1 is connected to the line L2 and the cathode of the diode D1 is connected to the collector of the transistor T1. The base of the transistor T1 is connected with the connection point between the cathode of the Zener diode ZD and the resistor R1.

The voltage regulator SP contains at least one circuit, not specified in more detail, which is symbolized by resistor R5 and lies between the input E1 and the output A1 connected with the control apparatus SG. Further, the input E1 is connected with a pole of a switch S whose other pole is guided to the output A2 via a circuit symbolized by R6. A2 leads to the control apparatus SG. The switch S is triggered via the input E2 of the voltage regulator SP.

The voltage regulator SP of the control apparatus SG is permanently connected with the battery BA via the line L1. The parts of the control apparatus and vehicle mains which must constantly be supplied with voltage are supplied via this permanent connection line. The part of the SG which must be supplied when the ignition switch ZS is closed is also supplied via this line L1 regardless of the state of the line L2.

In addition to this permanent positive supply, the control apparatus and subsequently arranged consumers, not shown, are supplied with a connected battery voltage via the second line L2. This connected battery voltage is conducted further to the voltage regulator SP via the ignition switch ZS when the engine is turned off, that is when the ignition switch is opened the voltage supply to the voltage regulator SP is interrupted. The part of the voltage regulator which is to be without power when the engine is switched off is switched off by this input.

Since temporary voltage drops can keep occurring during the operation of the motor vehicle, e.g. when connecting additional consumers or because of a loose connection, there is a risk that the control apparatus will execute a resetting and accordingly a reinitializing of the microcomputer when such a voltage drop occurs. The control apparatus cannot control the ignition or injection during this initializing period.

Such a voltage drop on supply line L1, which is shown in the drawing by the drop in the battery voltage UB to zero, is compensated for by the circuit arrangement between lines L1 and L2.

During such a temporary interruption on line L1 the connected battery voltage is conducted from line L2 to line L1 via the conducting transistor T1 so that such a voltage drop has no further effect at the input E1. The capacitor C1 which discharges in the normal state charges itself via the resistors R1 and R2 by the base current of the transistor T1. As long as the voltage does not fall below a predetermined voltage UE1 at the input E1 of the voltage regulator, the operation of the control apparatus is fully ensured.

The maximum allowable period of interruption before a switching off of the control apparatus is determined by the dimensioning of the capacitor C1 and by the corresponding charging time required to reach the voltage resulting from Kirchoff's second law. Thus, the following relationship applies:

$$UB - UC1, (ZUL) - UR1 - UBE - UR2 > UE1, MIN-$$
ZUL is a threshold level for UC1

Thus, as long as the period of interruption is shorter than the charging time of the capacitor the control apparatus SG remains switched on and its voltage supply is maintained via the connection D1, T1, R2.

If the voltage at the capacitor UC1 exceeds the allowable value UC1, (ZUL) the control apparatus is switched off. When the capacitor C1 is fully charged, the transistor T1 blocks so that the voltage supply at the input E1 is interrupted proceeding from line L2.

When the supply of voltage to the control apparatus is reestablished via the permanent voltage supply via line L1 when the disturbance has been eliminated, the capacitor C1 is discharged via the Zener diode ZD and the protective resistor R1.

The Zener diode has the additional object, together with the resistor R2, of limiting current in the conductive state of the transistor T1.

The diode D1 prevents a switching on of the voltage regulator via the Zener diode ZD and the base-collector junction of the transistor T1 proceeding from line 1 (permanent voltage supply).

The circuit part which is connected with line L2 and includes the diode D2, the resistors R3 and R4 and the capacitor C2 serves to bridge temporary voltage drops at the connected voltage (UE2). When such a voltage drop occurs the diode D2 prevents a discharging of the capacitor C2 via the resistor R3.

It will be understood that each of the elements described above, or two or more together, may also find a useful application in other types of constructions differing from the types described above.

While the invention has been illustrated and described as embodied in a device for suppressing voltage drops, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for suppressing voltage drops in apparatuses which can be connected with a battery, the device comprising at least two lines adapted to connect an apparatus with a battery for its voltage supply; and a circuit arrangement situated between said two lines so that a connection to a said second one of said lines is produced when a voltage drop occurs in a first one of said lines, said circuit arrangement including a series connection of a Zener diode, a resistor and a capacitor which lie between said first line and second line, a series connection of another resistor, an emitter-collector junction of a transistor, a switching means which connects said second line with the battery, and a diode which lies parallel to the former, a base of said transistor being connected with a cathode of said Zener diode, an anode of the Zener diode being connected with said first line, and the anode of the diode being connected with said second line.

2. A device as defined in claim 1, wherein the apparatus is a control apparatus in a vehicle, said first line permanently connecting the control apparatus with the battery, said second line being connectable to the battery.

3. A device as defined in claim 1, wherein said switching means includes an ignition switch.

4. A device as defined in claim 3; and further comprising a voltage regulator, said ignition switch being connected with an input of said voltage regulator via said second line and an RC network.

5. A device as defined in claim 3; and further comprising a voltage regulator, said ignition switch being connected with an input of said voltage regulator via said second line and an RC network, said diode lying between said ignition switch and said RC network, said diode having an anode which is connected to said ignition switch.

6. A device as defined in claim 3, wherein said ignition switch has a side remote from the battery; and further comprising an additional line connecting said side of said ignition switch with the apparatus.

* * * * *